US011236672B2

(12) United States Patent
Roberge (10) Patent No.: US 11,236,672 B2
(45) Date of Patent: Feb. 1, 2022

(54) OIL THERMAL MANAGEMENT SYSTEM FOR COLD WEATHER OPERATIONS OF A GAS TURBINE ENGINE

(71) Applicant: United Technologies Corporation, Farmington, CT (US)

(72) Inventor: Gary D. Roberge, Tolland, CT (US)

(73) Assignee: Raytheon Technologies Corporation, Farmington, CT (US)

(*) Notice: Subject to any disclaimer, the term of this patent is extended or adjusted under 35 U.S.C. 154(b) by 200 days.

(21) Appl. No.: 16/008,141

(22) Filed: Jun. 14, 2018

(65) Prior Publication Data

US 2019/0383217 A1 Dec. 19, 2019

(51) Int. Cl.

| F01D 25/18 | (2006.01) |
|---|---|
| F02C 7/06 | (2006.01) |
| F02C 7/26 | (2006.01) |
| F02C 9/00 | (2006.01) |
| F01M 1/02 | (2006.01) |
| F01M 11/00 | (2006.01) |

(52) U.S. Cl.
CPC ............... *F02C 7/06* (2013.01); *F01M 1/02* (2013.01); *F01M 11/0004* (2013.01); *F02C 7/26* (2013.01); *F02C 9/00* (2013.01); *F01M 2011/0025* (2013.01); *F01M 2250/60* (2013.01); *F05D 2220/32* (2013.01); *F05D 2270/42* (2013.01)

(58) Field of Classification Search
CPC ........... F05D 2260/98; F05D 2270/303; F01D 25/18; F02C 9/00; F01M 1/02; F01M 5/021; F01M 2005/023
See application file for complete search history.

(56) References Cited

U.S. PATENT DOCUMENTS

| 2,289,981 | A | * | 7/1942 | McDonald | .................... 392/498 |
| 8,479,486 | B2 | * | 7/2013 | Angst | ...................... F02C 7/06 |
| | | | | | 60/39.08 |
| 8,887,869 | B2 | * | 11/2014 | Pisseloup | ............... B42D 15/00 |
| | | | | | 184/6.11 |
| 9,399,934 | B2 | | 7/2016 | Barber et al. | |
| 9,810,113 | B2 | | 11/2017 | Krug | |
| 10,054,053 | B2 | * | 8/2018 | Thiriet | .................... F02C 7/268 |
| 10,221,770 | B2 | * | 3/2019 | Sheridan | .................. F02C 7/36 |
| 2007/0246302 | A1 | | 10/2007 | Bell et al. | |
| 2010/0012434 | A1 | * | 1/2010 | Pisseloup | ............... B42D 15/00 |
| | | | | | 184/6.11 |
| 2018/0187601 | A1 | * | 7/2018 | Segura Martinez De Ilarduya .... | |
| | | | | | F01D 25/10 |
| 2018/0371969 | A1 | * | 12/2018 | McCormick | ............. F02C 7/32 |

\* cited by examiner

*Primary Examiner* — Arun Goyal
(74) *Attorney, Agent, or Firm* — Bachman & LaPointe, P.C.

(57) ABSTRACT

An oil thermal management system for a gas turbine engine includes a control system operable to selectively heat oil in the oil system with the heater system greater than a predetermined temperature prior to engine start. A method of starting a gas turbine engine includes sensing an oil temperature with respect to a predetermined oil temperature for engine start; and heating the oil to the predetermined oil temperature for engine start in response to the oil temperature being less than the predetermined oil temperature.

7 Claims, 6 Drawing Sheets

OIL THERMAL MANAGEMENT SYSTEM FOR COLD WEATHER OPERATIONS OF A GAS TURBINE ENGINE

BACKGROUND

The present disclosure relates to an oil thermal management system and, more particularly, to an on-board heating system for cold weather operations of a gas turbine engine.

Aircraft gas turbine engines include an oil system to supply oil to various components. In extreme cold weather environments where the aircraft may be parked overnight or otherwise left to cold-soak, special procedures and logistical infrastructure are typically required to pre-heat the engine prior to initiating engine start. This may involve external ground equipment including heaters along with engine inlet and exhaust covers to allow heat to be retained during the heating process.

SUMMARY

An oil thermal management system for a gas turbine engine according to one disclosed non-limiting embodiment of the present disclosure includes an oil system; a heater system; and a control system operable to selectively operate the heater system to heat oil in the oil system to a temperature greater than a predetermined temperature prior to engine start.

A further embodiment of any of the foregoing embodiments of the present disclosure includes that the oil system is in communication with a geared architecture of the gas turbine engine.

A further embodiment of any of the foregoing embodiments of the present disclosure includes a heater element in contact with the oil tank.

A further embodiment of any of the foregoing embodiments of the present disclosure includes a heater element around a recirculation conduit in communication with the oil tank.

A further embodiment of any of the foregoing embodiments of the present disclosure includes a circulation pump in communication with the recirculation conduit.

A further embodiment of any of the foregoing embodiments of the present disclosure includes that the circulation pump is operable in concert with the heater element.

A further embodiment of any of the foregoing embodiments of the present disclosure includes that the predetermined temperature is less than −40 degrees F. (−40 degrees C.).

An oil thermal management system for a gas turbine engine according to one disclosed non-limiting embodiment of the present disclosure includes an oil tank; and a heater element to selectively heat oil in the oil tank to a temperature greater than a predetermined temperature prior to engine start.

A further embodiment of any of the foregoing embodiments of the present disclosure includes that the heater element is in contact with the oil tank.

A further embodiment of any of the foregoing embodiments of the present disclosure includes that the heater element is around a recirculation conduit.

A further embodiment of any of the foregoing embodiments of the present disclosure includes a circulation pump in communication with the recirculation conduit to recirculate the oil within the oil tank.

A further embodiment of any of the foregoing embodiments of the present disclosure includes that the circulation pump is operable in concert with the heater element.

A further embodiment of any of the foregoing embodiments of the present disclosure includes that the circulation pump is downstream of a check valve in an oil return in communication with the oil tank.

A further embodiment of any of the foregoing embodiments of the present disclosure includes that the oil system is in communication with a geared architecture of the gas turbine engine.

A further embodiment of any of the foregoing embodiments of the present disclosure includes that the predetermined temperature is less than −40 degrees F. (−40 degrees C.).

A further embodiment of any of the foregoing embodiments of the present disclosure includes that the oil system is in communication with a journal bearing of the geared architecture.

A method for starting a gas turbine engine according to one disclosed non-limiting embodiment of the present disclosure includes sensing an oil temperature with respect to a predetermined oil temperature associated with engine start; and heating the oil to the predetermined oil temperature in response to the oil temperature being less than the predetermined oil temperature.

A further embodiment of any of the foregoing embodiments of the present disclosure includes that the predetermined oil temperature is less than −40 degrees F. (−40 degrees C.).

A further embodiment of any of the foregoing embodiments of the present disclosure includes heating the oil in an oil tank through conduction.

A further embodiment of any of the foregoing embodiments of the present disclosure includes recirculating the oil while heating the oil.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
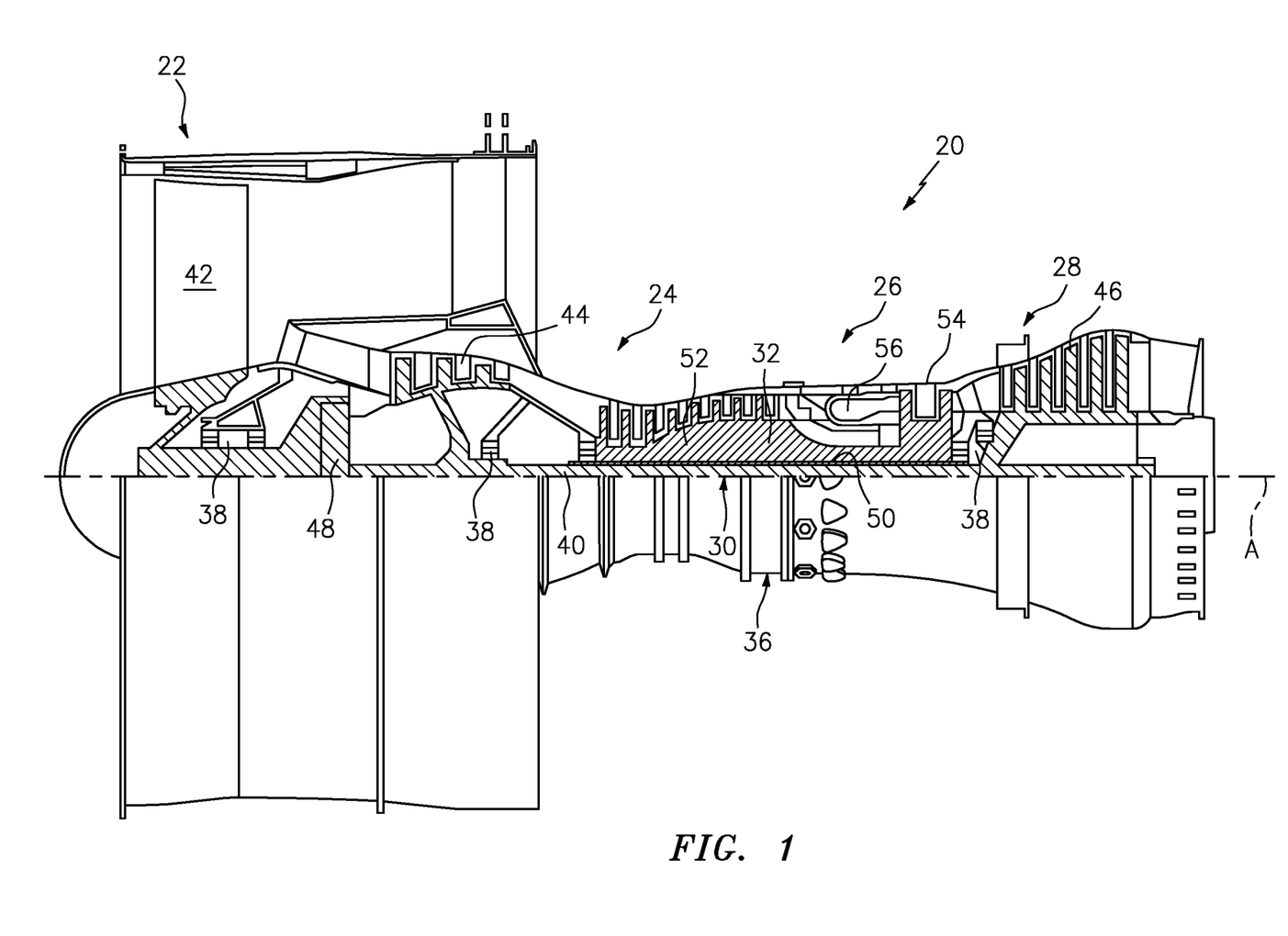
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26, and a turbine section 28. The fan section 22 drives air along a bypass flowpath while the compressor section 24 drives air along a core flowpath for compression and communication into the combustor section 26, then expansion through the turbine section 28. Although depicted as a turbofan in the disclosed non-limiting embodiment, it should be appreciated that the concepts described herein may be applied to other engine architectures such as turbojets, turboshafts, and three-spool (plus fan) turbofans.

The engine 20 generally includes a low spool 30 and a high spool 32 mounted for rotation about an engine central longitudinal axis A relative to an engine static structure 36 via several bearings 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 that drives the fan 42 at a lower speed than the low spool 30. An exemplary reduction transmission is an epicyclic transmission, such as a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis X which is collinear with their longitudinal axes.

Core airflow is compressed by the LPC 44, then the HPC 52, mixed with the fuel and burned in the combustor 56, then expanded over the HPT 54 and the LPT 46 which rotationally drive the respective high spool 32 and the low spool 30 in response to the expansion. The main engine shafts 40, 50 are supported at a plurality of points by bearings 38 within the static structure 36. It should be appreciated that various bearings 38 at various locations may alternatively or additionally be provided.

A significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $("T"/518.7)^{0.5}$. in which "T" represents the ambient temperature in degrees Rankine. The Low Corrected Fan Tip Speed according to one non-limiting embodiment of the example gas turbine engine 20 is less than about 1150 fps (351 m/s).

In one non-limiting example, the geared architecture 48 has a gear reduction ratio of greater than about 2.3, and in another example is greater than about 2.5. The geared turbofan enables operation of the low spool 30 at higher speeds which can increase the operational efficiency of the LPC 44 and LPT 46 to provide increased pressure in a fewer number of stages. A pressure ratio associated with the LPT 46 is pressure measured prior to the inlet of the LPT 46 as related to the pressure at the outlet of the LPT 46 prior to an exhaust nozzle of the gas turbine engine 20. The bypass ratio of the gas turbine engine 20 is greater than about ten (10:1), the fan diameter is significantly larger than that of the LPC 44, and the LPT 46 has a pressure ratio that is greater than about five (5:1). It should be appreciated, however, that the above parameters are only exemplary of one example geared architecture engine but is applicable to other gas turbine engines including direct drive turbofans.

Figure 2:
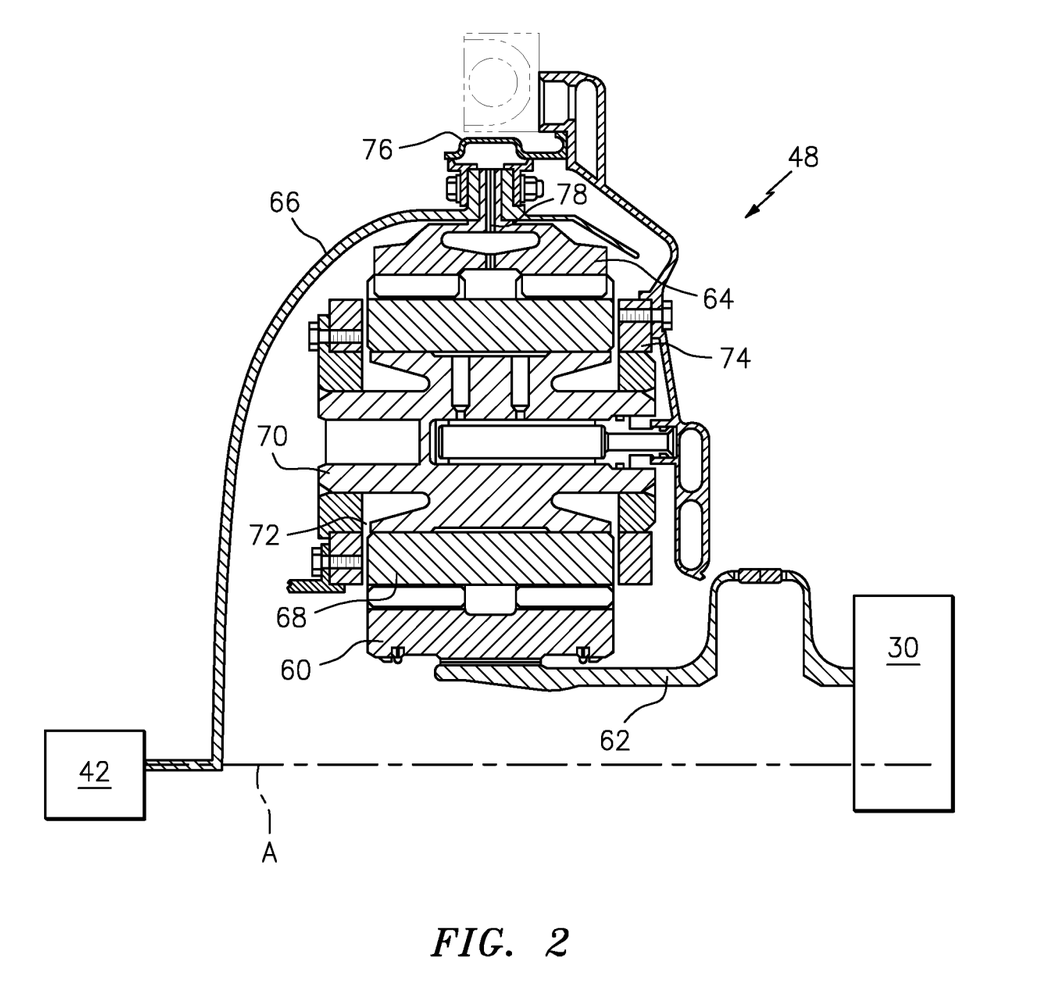
FIG. 2 is an enlarged schematic cross-section of a geared architecture of the gas turbine engine.

With reference to FIG. 2, the geared architecture 48 includes a sun gear 60 driven by a sun gear input shaft 62 from the low speed spool 30, a ring gear 64 connected to a ring gear output shaft 66 to drive the fan 42 and a set of intermediate gears 68 in meshing engagement with the sun gear 60 and ring gear 64. Each intermediate gear 68 is mounted about a journal pin 70 which are each respectively supported by a carrier 74. The input shaft 62 and the output shaft 66 counter-rotate as the sun gear 60 and the ring gear 64 are rotatable about the engine central longitudinal axis A. The carrier 74 is grounded and non-rotatable even though the individual intermediate gears 68 are each rotatable about their respective axes 80. An oil recovery gutter 76 is located around the ring gear 64. The oil recovery gutter 76 may be radially arranged with respect to the engine central longitudinal axis A.

A replenishable film of oil, not shown, is supplied to an annular space 72 between each intermediate gear 68 and the respective journal pin 70. One example of an applicable oil is oil that meets U.S. Military Specification MIL-PRF-23699, for example, Mobil Jet Oil II manufactured by ExxonMobil Aviation, United States. Oil is supplied through the carrier 74 and into each journal pin 70 to lubricate and cool the gears 60, 64, 68 of the geared architecture 48. Once communicated through the geared architecture 48 the oil is radially expelled thru the oil recovery gutter 76 in the ring gear 64 by various paths such as oil passage 78.

Many engine components tolerate relatively high viscosity oil during extreme low temperature operations, however, components such as the journal pins 70 may be relatively less tolerant of relatively high viscosity oil. Accordingly, it is desirable to ensure that relatively lower viscosity oil flows to the journal pins 70 during extreme low temperature conditions during engine operations. In one example, before start-up, if engine oil temperature is −40 degrees F. (−40 degrees C.) or warmer, no oil pre-heat may be required. Engine thrust above idle power should be avoided until the engine oil temperature is at least 120 degrees F. (49 degrees C.) and engine oil temperature should be significantly warmer than 120 degrees F. (49 degrees C.) before takeoff. Operations to 30% N1 (fan speed) may be permitted with minimum oil temperatures at or above 21 degrees F. (−6 degrees C.) and operation to 50% N1 may be permitted with temperatures above 70 degrees F. (21 degrees C.).

Figure 3:
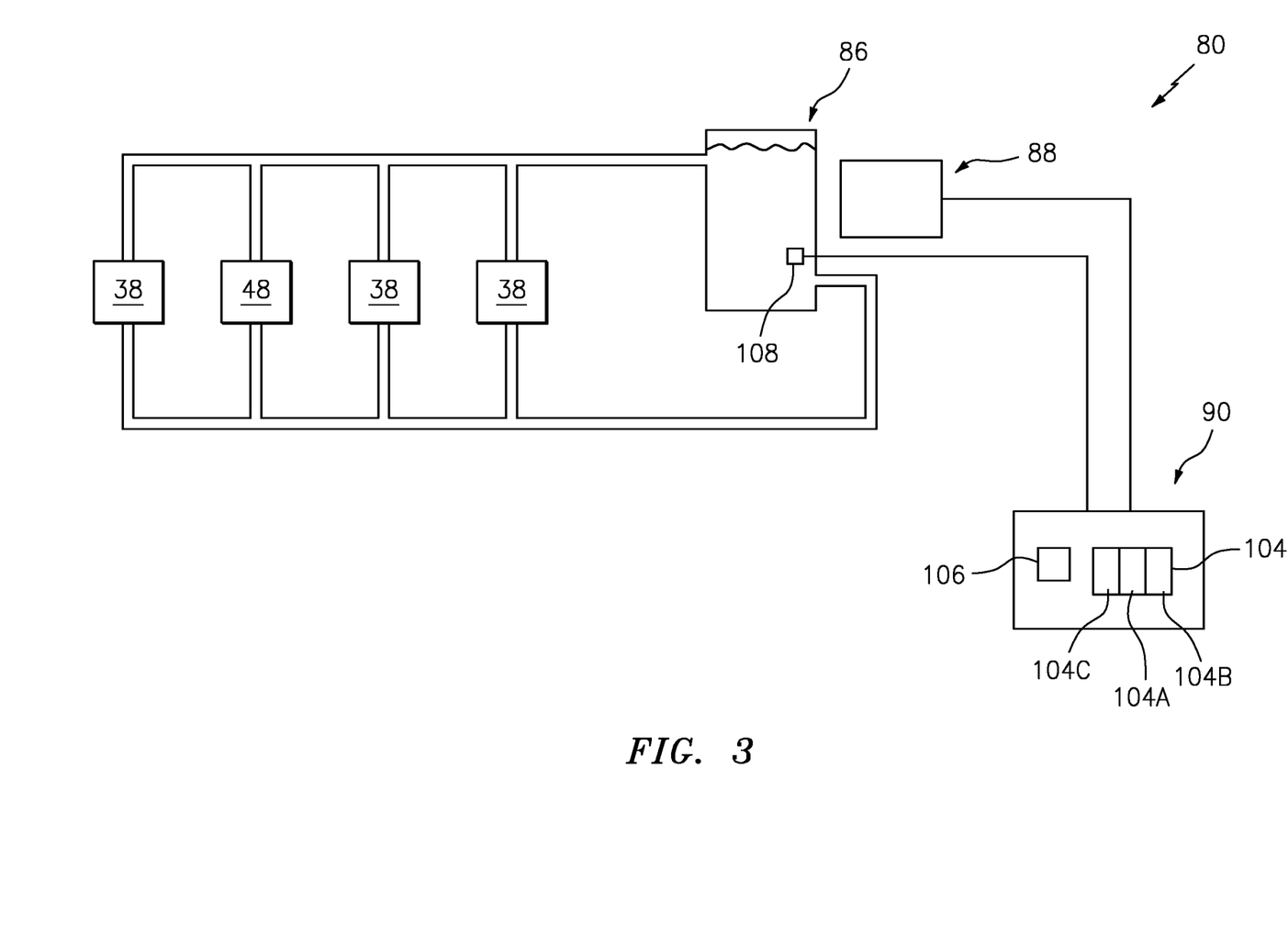
FIG. 3 is a schematic diagram of a oil thermal management system.

With Reference to FIG. 3, an oil thermal management system 80 is schematically illustrated in block diagram form for the geared architecture 48 as well as other components 84 (illustrated schematically) which receive oil. The oil thermal management system 80 generally includes an oil system 86, a heater system 88, and a control system 90.

The oil system 86 generally includes an oil tank 92 which is a source of oil for the geared architecture 48, the bearings 38 and/or other engine components and systems. The oil tank 92, in one example, may be between 2-10 gallons in capacity. It should be appreciated that although not shown, the oil system 86 may include numerous other components such as a sump, scavenge pump, main pump and various oil reconditioning components such as chip detectors, heat exchangers and deaerators.

Figure 5:
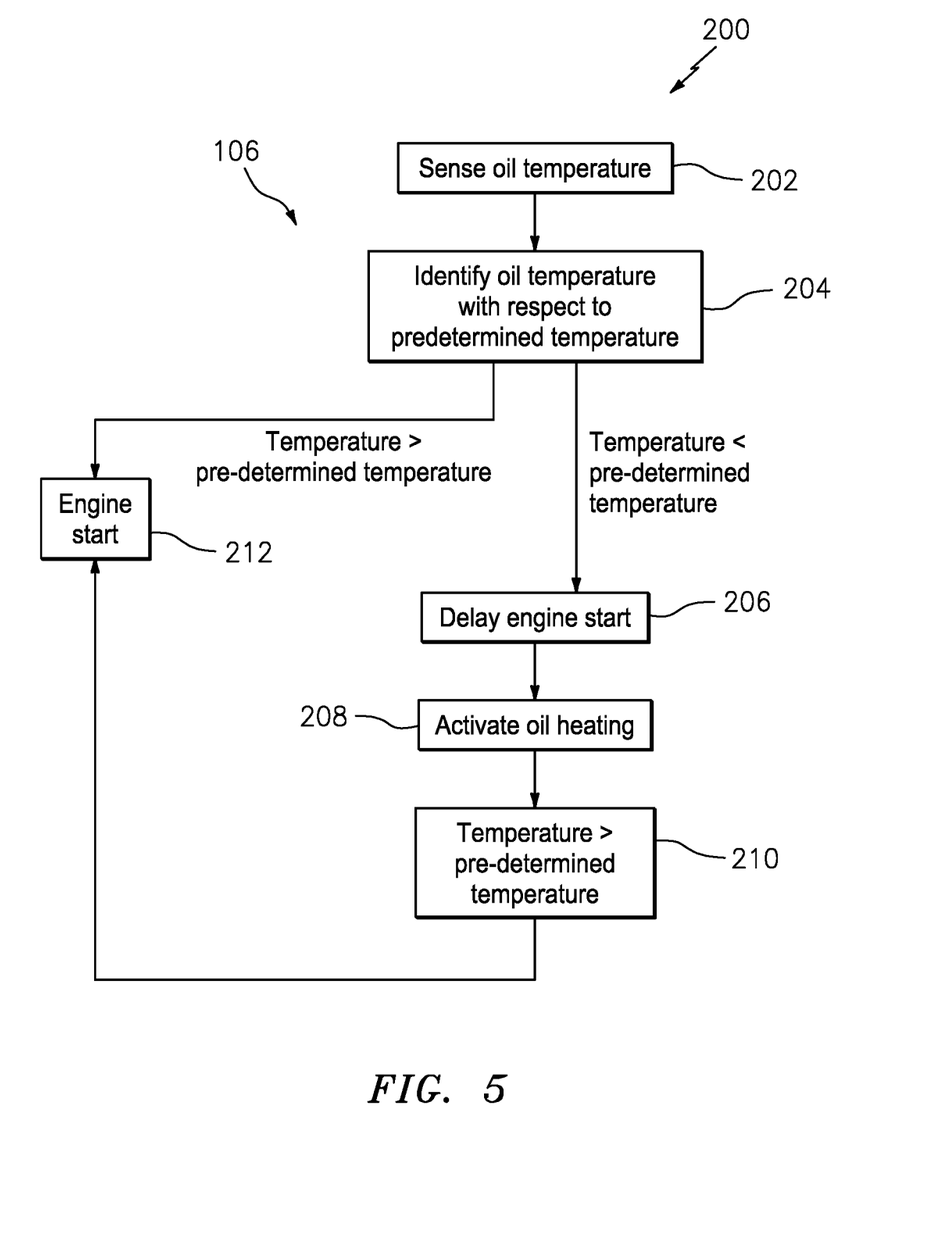
FIG. 5 is a block diagram of a method that executes oil pre-start heating logic.

The control system 90 generally includes a control module 104 that executes oil pre-start logic 106 (FIG. 5). The functions of the logic 106 are disclosed in terms of functional block diagrams, and it should be appreciated that these functions may be enacted in either dedicated hardware circuitry or programmed software routines capable of execution in a microprocessor based electronics control embodiment. In one example, the control module 104 may be a portion of a flight control computer, a portion of a Full Authority Digital Engine Control (FADEC), a stand-alone unit, or other system.

The control module 104 typically includes a processor 104A, a memory 104B, and an interface 104C. The processor 104A may be any type of known microprocessor having desired performance characteristics. The memory 104B may be any computer readable medium which stores data and control algorithms such as the logic 106 as described herein. The interface 104C facilitates communication with other components such as a temperature sensor 108 within the oil system 86.

Figure 4:
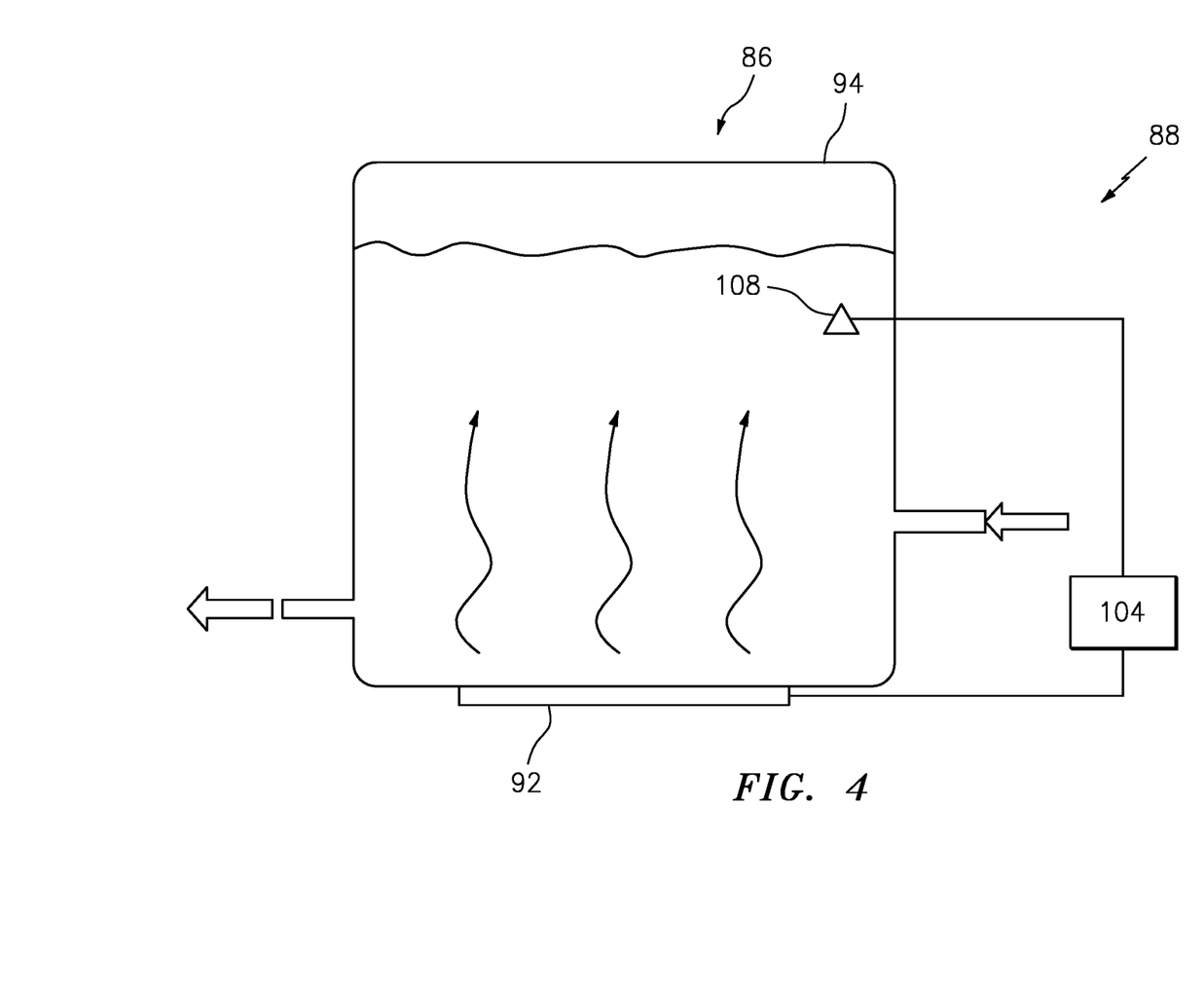
FIG. 4 is a schematic diagram of an oil tank of the oil system and a heater system therefor according to one disclosed non-limiting embodiment.

With reference to FIG. 4, in one embodiment, the heater system 88 may include a heating element 92 external to the oil tank 94. The heating element 92 may be electrically powered and mounted directedly to the oil tank 94 to heat the oil 96 therein through conduction through the wall of tank 94 and passive convective circulation of oil within tank 94 with oil temperature monitored by temperature sensor 108.

With reference to FIG. 5, during a method 200 for engine start, the oil pre-start logic 106 of the oil thermal management system 80 initially senses (step 202) the temperature of the oil with the temperature sensor 108, and then communicates same to the control module 104. The method 200 for engine start may be a pre-start flight operation preparation after cold-soak.

The oil pre-start logic 106 will then identify (step 204) whether an oil temperature increase condition is required prior to engine start. Should such a condition exist, the control module 104 will delay the engine start procedure (step 206) and activate (step 208) the heating element 92 to increase the temperature of the oil until the temperature sensor 108 indicates the oil temperature is greater than a predetermined engine start temperature (step 210), for example, −40 degrees F. (−40 degrees C.). Once the oil temperature is greater than the predetermined engine start temperature, the engine start procedure (step 212) may continue.

Figure 6:
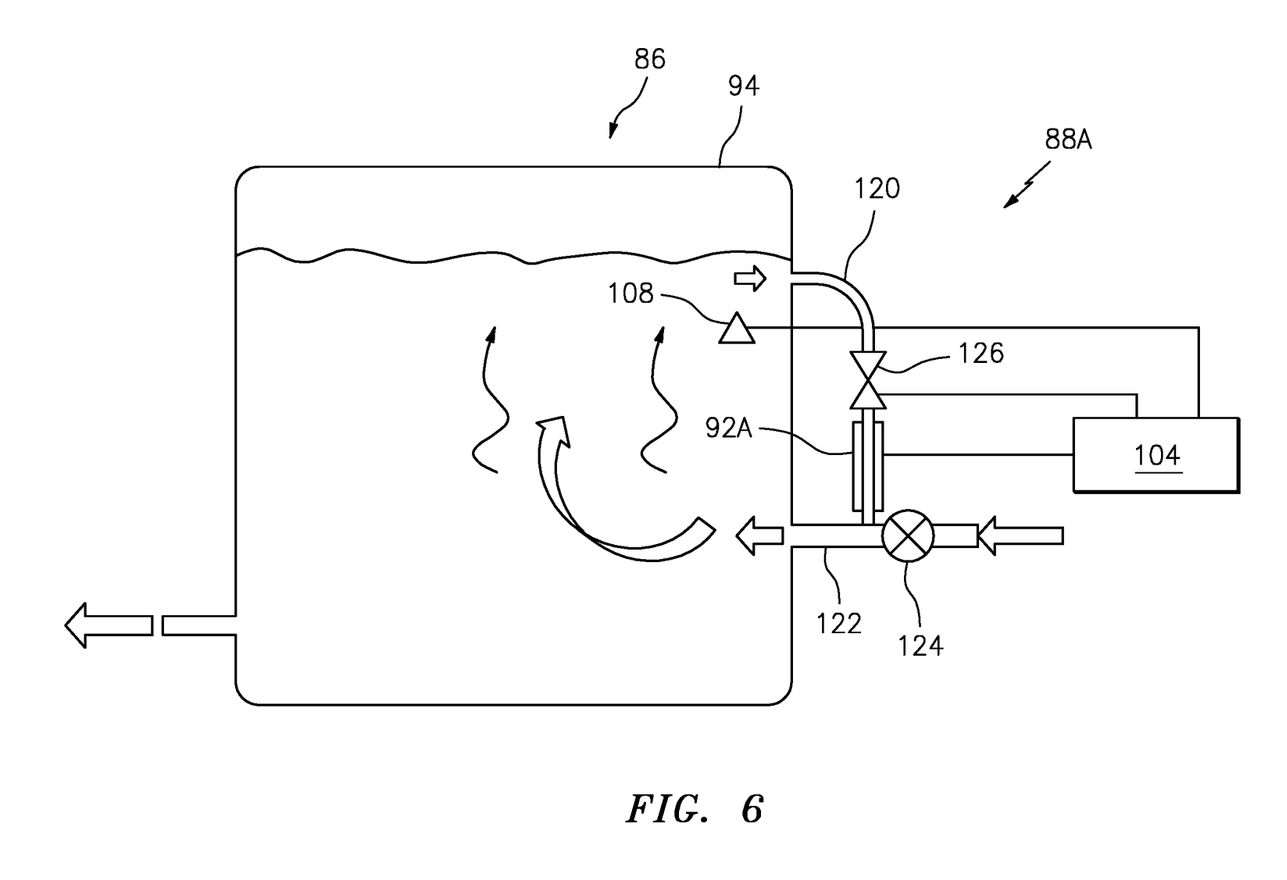
FIG. 6 is a schematic diagram of an oil tank of the oil system and a heater system therefor according to another disclosed non-limiting embodiment.

With reference to FIG. 6, another disclosed non-limiting embodiment of the heater system 88A may include a heating element 92A along a recirculation conduit 120 that recirculates oil between the oil tank 94 and an oil return passage 122 downstream of a check valve 124. An oil circulation pump 126 along the recirculation conduit 120 provides forced circulation and enhanced convection of the oil that is heated in-line within the recirculation conduit 120. The oil circulation pump 126 may be particularly tailored to circulate the oil when the oil is in a high viscosity state due to low temperature operations such as less than −40 degrees F. (−40 degrees C.). The oil circulation pump 126 and the heating element 92A are operated in concert in response to the control system 90 as discussed above.

The oil thermal management system 80 produces and maintains a minimum oil temperature regardless of ambient temperature thereby permitting engine start without external ground equipment. More-electric, hybrid electric, and other engine architectures offer self-contained eclectic power to operate the heater system 88 in a readily automated manner during the start procedure to reduce logistics footprint, manpower, and flight delays. Use of ground power, battery power, APU power and cross-engine power supplies whereby a single engine is electrically heated, started and then used as a power source to drive electric heating of other engines are all additional or alternative power sources.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed:

1. An oil thermal management system for a gas turbine engine, comprising:
   a geared architecture that drives a fan at a lower speed than a low spool of the gas turbine engine during engine operation;
   an oil system in communication with the geared architecture to supply oil;
   an oil return passage having a check valve connected to an inlet of an oil tank;
   the oil tank connected to at least the geared architecture through a first outlet;
   a recirculation conduit connected to a second outlet of the oil tank and the oil return passage between the check valve and the inlet;
   a heater system that comprises a heater element thermally coupled with the recirculation conduit;
   an oil circulation pump in fluid communication with the recirculation conduit, wherein the oil circulation pump and the heating element are in series along the recirculation conduit in that order from the second outlet to the inlet; and
   a control system in communication with the circulation pump, the heating element and a temperature sensor in the oil tank, the control system executes oil pre-start logic operable to delay an engine start procedure and selectively operate the heater system and the circulation pump to heat oil in the oil tank of the oil system to a temperature greater than a predetermined temperature prior to engine start, wherein the predetermined oil temperature is less than −40 degrees F. (−40 degrees C.).

2. The system as recited in claim 1, wherein the circulation pump is operable to circulate the oil when the oil is less than −40 degrees F. (−40 degrees C.).

3. The system as recited in claim 1, wherein the oil thermal management system maintains the minimum oil temperature regardless of ambient temperature thereby permitting engine start without external ground equipment.

4. A method for starting a gas turbine engine comprising:
   initiating a pre-start flight operation preparation;

sensing an oil temperature of oil in an oil tank with respect to a predetermined oil temperature associated with engine start, the oil in communication with a journal bearing of a geared architecture of the gas turbine engine that drives a fan at a lower speed than a low spool of the gas turbine engine during engine operation;

delaying the engine start in response to the oil temperature being less than the predetermined oil temperature;

circulating the oil while heating through conduction via a circulation pump in fluid communication with a recirculation conduit, wherein an oil return passage returns the oil to an inlet of the oil tank through a check valve, wherein the circulation pump and a heating element are in series along the recirculation conduit in that order from an outlet of the oil tank to the inlet of the oil tank, the recirculation conduit connected to the outlet and an oil return passage downstream of the check valve in the oil return passage, wherein the circulating in the oil tank occurs prior to the engine start in response to the oil temperature being less than the predetermined oil temperature during the pre-start flight operation preparation when the oil is in a high viscosity state, the high viscosity state is due to temperature operations less than −40 degrees F. (−40 degrees C.); and initiating the engine start procedure once the oil temperature within the oil tank is greater than the predetermined oil engine start temperature.

5. The method as recited in claim 4, wherein initiating the pre-start flight operation preparation comprises executing oil pre-start logic after cold-soak.

6. The method as recited in claim 4, wherein initiating the pre-start flight operation preparation comprises executing oil pre-start logic prior to engine start.

7. The system as recited in claim 2, wherein the circulation pump and the heating element are operated in concert prior to engine start.

* * * * *